Jan. 16, 1923.
R. WOELZ ET AL.
MECHANICAL DIRECTION POINTER.
FILED JUNE 6, 1921.
1,442,760.
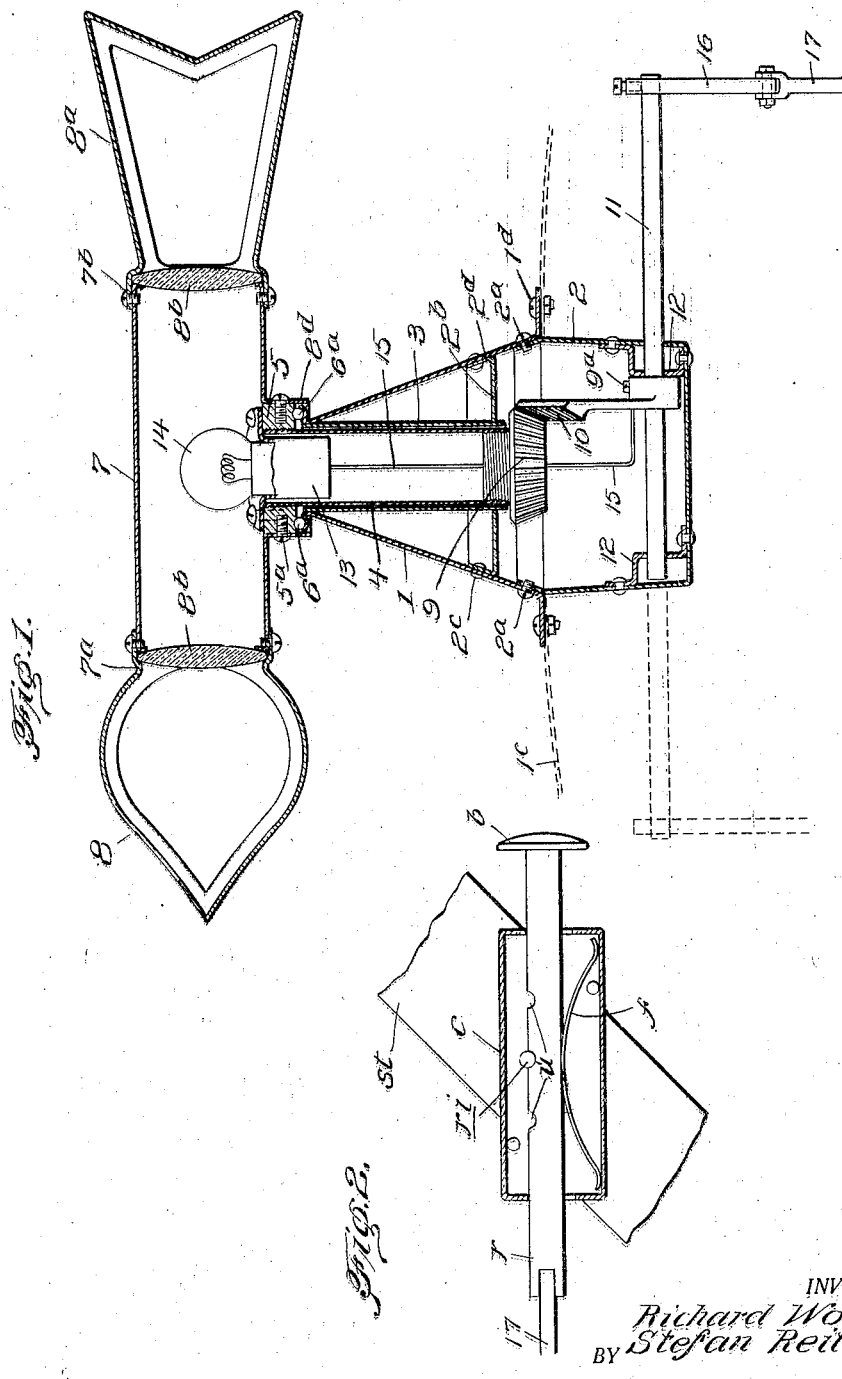
INVENTOR.
Richard Woelz and
BY Stefan Reiter.
Geo. P. Kimmel
ATTORNEY.

Patented Jan. 16, 1923.

1,442,760

UNITED STATES PATENT OFFICE.

RICHARD WOELZ AND STEFAN REITER, OF MANCHESTER, NEW HAMPSHIRE.

MECHANICAL DIRECTION POINTER.

Application filed June 6, 1921. Serial No. 475,566.

*To all whom it may concern:*

Be it known that we, RICHARD WOELZ and STEFAN REITER, citizens of the United States, residing at Manchester, in the county of Hillsborough and State of New Hampshire, have invented certain new and useful Improvements in Mechanical Direction Pointers, of which the following is a specification.

This invention relates to signals and more particularly to a motor vehicle signal.

The primary object of the invention is the provision of a mechanically adjustable motor vehicle signal capable of being mounted on the mud guards and fenders of a motor vehicle, and operable from a position at the driver's seat to indicate the proposed direction of travel of the machine to those following in the rear.

One of the objects of the invention is to produce a mechanically operable signal, in a manner as hereinafter set forth wherein the rotatable shaft for an indicating pointer or arm carried thereby, is mounted in a sectional casting adapted to be preferably secured to the front fenders of a motor vehicle and operated through the medium of an adjustable means, on the steering post of the vehicle for actuating the pointer or arm in a plurality of positions to indicate the proposed travel of the machine.

A still further object of the invention is to provide a mechanically operated signal, in a manner as hereinafter set forth and including a tubular shaft or spindle provided with a pointer or arm and whereby the tubular shaft or spindle and the pointer or arm are designed to receive an incandescent lamp to illuminate the front and rear of the said indicating pointer or arm so as to signal the proposed travel of the machine to operators in the rear.

The invention will be best understood from a consideration of the following detailed description taken in connection with the accompanying drawings forming a part of this specification, with the understanding, however, that the invention is not confined to any strict conformity with the showing in the drawing, but may be changed and modified so long as such changes and modifications mark no material departure from the salient features of the invention as expressed in the appended claims.

We attain these objects and others in the accompanying drawings, wherein:—

Figure 1 is a side elevation of the signal and its operating mechanism.

Figure 2 is a detail view of the adjusting device for the signal attached to the steering post of a motor vehicle.

Referring now to the drawings wherein like parts designate corresponding parts throughout the several views, numeral 1 designates the top section and 2 the bottom section of a casing, secured to each other by screws or other suitable fastening elements and which constitute a housing for the operating gearing of the indicator, the same being preferably attached to the closed, top portion of the front fenders shown by the dotted lines on Figure 1.

The top section 1, of the casing, is conoidal in contour and the bottom section 2, flaring and formed at its upper end with an inwardly extending and upwardly inclined flange $1^a$, which is overlapped by the lower portion of the section 1. The screws $2^a$, extend through the lower portion of the section 1, and the flange $1^a$, whereby the two sections of the casing are secured together. The section 1, at its lower end terminates in outwardly projecting and oppositely disposed flanges $1^b$, which are secured to the fender $1^c$ by the hold-fast devices $1^d$.

Arranged centrally of the upper section 1, of the casing, is a vertically disposed shaft guide or tubing 3, which is welded or otherwise secured to the upper end of the section 1. The tube 3, at a point removed from its lower end, is supported or braced by a flat plate $2^b$, which is flanged as at $2^c$, and secured to the inner face of the lower portion of the section 1, by the hold-fast devices $2^d$. Extending upwardly through the guide 3 is a vertically disposed rotatable hollow shaft or spindle 4, which is provided with internal threads at its lower ends and peripheral threads at its upper end. The spindle 4 projects above the guide 3, and engaging with the peripheral threads of said spindle 4, is an interiorly threaded bearing ring 5, which is positioned to contact with the bearing balls 6, supported in an outwardly projecting grooved annular flange $6^a$ at the upepr end of the section 1.

The indicating pointer or arm, is in the form of an arrow, and comprises a hollow body portion 7, and to one end thereof is secured, as at $7^a$ a pointed end portion 8, and to the other end thereof, is attached as at $7^b$, a tail portion $8^a$. At each end of the body portion 7, is secured a lens 8$^b$, each of a different color with respect to the other, preferably one red and one white. The body portion 7, centrally of the bottom thereof, is formed with an opening 8$^c$, and surrounding the latter is a depending cylindrical sleeve 8$^d$, which incloses, as well as depends, below the flange 6$^a$. The sleeve 8$^d$, is secured to the bearing ring 5, by the hold-fast devices 5$^a$, and by this arrangement, when the spindle 4 is rotated, the indicating pointer or arm will be carried therewith.

A bevel gear pinion 9, screwed to the threaded bottom end of the shaft or spindle meshes with a beveled sector 10, the sector being connected by a set screw 9$^a$ to a controlling actuating rod 11, operable in the bearings 12, of the lower section 2 of the casing.

An incandescent lamp socket 13 is disposed within the upper portion of the hollow spindle 4, and said socket is secured to the bearing ring 5, by the hold-fast devices 5$^b$. The socket 13, is connected with the headlight system of the vehicle, by a conductor 15. Mounted in the socket 13 and extending in the body portion 7, is a lamp 14.

A suitable lever and sliding rod arrangement 16, 17, preferably operable from a position at the driver's seat is provided to operate the controlling rod 11, and the gearing whereby the pointer or indicator is turned to the proper direction. In this particular instance we have secured one end of the sliding rod to an adjustable short actuating bar or rod $r$, having a handle or knob $b$, operable in a casing or guide $c$, attached to the steering post $st$ adjacent the steering wheel. The rod $r$, has three notches $u$ on its top for engagement with a rounded pin or lug $ri$, being held therein by the flat leaf spring $f$, as clearly shown by Figure 2 of the drawing. By depressing the knob $b$, the rod $r$ may be easily disengaged from the pin and slid backward or forward, consequently actuating the connection rod 11 and the gearing to thus move the pointer to the desired position. While we have shown the invention as applied and mounted on but one fender, it is to be understood that if so desired that both fenders may be provided with the indicator and operating mechanism therefor so that separate actuating rods may extend through the single casing or housing on the steering post to permit the operator to turn the right or left hand indicator to signal the proposed direction of the vehicle.

In the accompanying drawings, we have illustrated our invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described our invention what we claim as new and desire to secure by Letters Patent of the United States, is:—

1. A device for the purpose set forth comprising a casing, a vertically disposed tubular guide secured therein, a spindle arranged within and projecting above said guide, a laterally extending annular grooved flange projecting from the upper end of the casing, a bearing ring having threaded engagement with the upper ends of the spindle and opposing said flange, bearing elements interposed between the ring and flange, an indicator element formed with a depending sleeve inclosing said ring and flange, means for securing said sleeve to said ring, and means for operating said spindle to shift said arm.

2. A device for the purpose set forth comprising a vertically disposed rotatable element having its upper end formed with a laterally disposed bearing ring, a hollow cylindrical body disposed at right angles with respect to the axis of said element and connected to said ring and bodily movable with said element, a lens at each end of said body portion, means to provide an arrow head suspended from one end of said body portion laterally with respect to one of the lenses, means to provide the tail of an arrow suspended from the other end of the said body laterally with respect to the other lens, an illuminating device carried by said element and extended into said body portion, and a fixed support for said support, said support provided with bearing elements associated with said ring.

In testimony of which, we affix our signatures hereto.

RICHARD WOELZ.
STEFAN REITER.